United States Patent
Dickson (10) Patent No.: US 7,375,981 B2
(45) Date of Patent: May 20, 2008

(54) ELECTRIC POWER DISTRIBUTION AND CONTROL APPARATUS

(75) Inventor: Kevin Dickson, Winnipeg (CA)

(73) Assignee: Vansco Electronics LP, Winnipeg, Manitoba (CA)

( * ) Notice: Subject to any disclaimer, the term of this patent is extended or adjusted under 35 U.S.C. 154(b) by 198 days.

(21) Appl. No.: 11/370,176

(22) Filed: Mar. 8, 2006

(65) Prior Publication Data

US 2006/0205250 A1   Sep. 14, 2006

Related U.S. Application Data

(60) Provisional application No. 60/660,996, filed on Mar. 14, 2005.

(51) Int. Cl.
  H05K 1/11  (2006.01)
  H05K 1/14  (2006.01)
(52) U.S. Cl. .............. 361/803; 361/627; 361/669; 361/775; 439/76.2
(58) Field of Classification Search .......... 361/601, 361/622, 627, 641, 644, 669, 760, 785, 792, 361/803, 775; 439/76.2; 257/690–692
See application file for complete search history.

(56) References Cited

U.S. PATENT DOCUMENTS

| | | | | |
|---|---|---|---|---|
| 5,581,130 A | * | 12/1996 | Boucheron | 307/10.1 |
| 5,587,890 A | * | 12/1996 | Happ et al. | 361/826 |
| 5,653,607 A | * | 8/1997 | Saka et al. | 439/402 |
| 5,709,567 A | * | 1/1998 | Gladd et al. | 439/444 |
| 5,788,529 A | * | 8/1998 | Borzi et al. | 439/364 |
| 5,831,814 A | * | 11/1998 | Hamill | 361/627 |
| 6,496,377 B1 | | 12/2002 | Happ et al. | |
| 6,501,368 B1 | | 12/2002 | Wiebe et al. | |
| 6,580,953 B1 | | 6/2003 | Wiebe et al. | |
| 6,652,292 B2 | * | 11/2003 | Pratt et al. | 439/76.1 |

* cited by examiner

Primary Examiner—Tuan Dinh
(74) Attorney, Agent, or Firm—Adrian D. Battison; Michael R. Williams; Ryan W. Dupuis (57) ABSTRACT

An electric power distribution and control apparatus has a stack of conductive plates each having a plurality of spaced contact pads and conductive traces connecting the contact pads to others of the pads. At least one of the plates has contact terminals for connection to electrical components for supply of electrical current. An array of contact pins pass through holes in the plates at a respective one of the contact pads such that the array of pins provides connection between selected contact pads of different selected conductive plates. An electronic system for connection to a communication bus is added to the above known system by providing a main circuit board having the electronic components thereon, a mapping circuit board having a plurality of contact pads thereon arranged for connection to respective ones of the array of pins and a header having a male pin array and a female socket array connecting the main printed circuit board and the mapping circuit board.

16 Claims, 2 Drawing Sheets

ELECTRIC POWER DISTRIBUTION AND CONTROL APPARATUS

This application claims the benefit of priority under 35 U.S.C. 119 of the filing date of Mar. 14$^{th}$ 2005 of Provisional Application 60/660,996.

This invention relates to an electric power distribution and control apparatus including an electronic system defined by a circuit board and its components.

BACKGROUND OF THE INVENTION

In U.S. Pat. No. 6,496,377 (Happ) et al issued Dec. 17, 2002 and in a number of related patents all assigned to Cooper Technologies Company, is disclosed an arrangement for distribution of electrical power to components of a machine such as a vehicle.

This arrangement has led to a commercially significant product manufactured by Bussman Cooper which provides electrical connections and support for terminals for connection to fuses, relays and other components of the machine which receive electrical current from sources of supply attached to the device.

The arrangement is manufactured from conductive plates which are arranged side by side in a generally parallel overlying array with each plate having an array of contact pads thereon. The plates are separated each from the next by an insulation arrangement and the plates are connected by pins which extend at right angles to the plates through holes in the plates at the contact pads. The contact pads of each plate are connected by contact traces which are applied onto the plates. This arrangement allows economic manufacture of different constructions of connections for different machines. It will be appreciated that high production runs for example used on automobiles can carry the cost of tooling for manufacture of a power distribution apparatus which is tailored to the specific vehicle concerned. However other machines which do not have a such a high production run but require the power supply to be tailored to the particular requirements of the machine, require a power distribution apparatus which is manufactured in smaller runs. The device of the above patent has been found to be particularly effective in this regard and is widely used in the field for which it is primarily designed.

The patent also mentions in column 8 at line 46 that the apparatus may be directly attached to a printed circuit board of conventional design. This allows the apparatus to be interfaced with a range of electronic components and all mounted in the single housing.

However up till now no commercial arrangement has been generated of this device including a printed circuit board.

The provision of such a printed circuit board would enable the attachment of the system to the communication bus which is now commonly used in vehicles for more effective control of electronics within the vehicle. However it is well known that such electronic systems cannot economically control components with a high current draw.

Even though there is therefore a high demand and need for a product of this type, up till now no commercial success has been obtained.

SUMMARY OF THE INVENTION

It is one object of the invention to provide an electric power distribution and control apparatus which utilizes the arrangement described above and includes an electronic system defined by a circuit board and its components.

According to one aspect of the invention there is provided an electric power distribution and control apparatus comprising:

a plurality of conductive plates arranged in generally parallel, at least partly overlying relationship;

each conductive plate having a plurality of contact pads at spaced positions across the plate;

each conductive plate having conductive traces thereon electrically connecting certain one or ones of the contact pads thereon to certain other or others of the contact pads thereon;

at least one of the conductive plates having contact terminals in electrical connection therewith for connection to electrical components for supply of electrical current thereto or receipt of electrical current therefrom;

an array of contact pins each passing through at least one hole in at least one of the conductive plates at a location thereon at a respective one of the contact pads such that the array of pins provides connection between selected contact pads of different selected conductive plates;

an electronic system including at least one printed circuit board having electronic components mounted thereon including a processor;

the electronic system being arranged for connection to a communication bus for communication of data thereon relating to the electrical connections;

the electronic system being arranged to provide outputs for connection through at least one of the conductive plates to the contact terminals;

the electronic system being arranged to receive inputs through at least one of the conductive plates from the contact terminals;

the processor having a program for controlling communication on the communications bus and for controlling said outputs in response to said inputs and said communication;

the electronic system including at least one main printed circuit board having the electronic components thereon;

the electronic system including at least one mapping circuit board having a plurality of contact pads thereon arranged for connection to respective ones of the array of pins;

the electronic system including a header having a male pin array and a female socket array connecting the main printed circuit board and the mapping circuit board;

the mapping circuit board having a plurality of circuit traces thereon connecting the contact pads thereon to the header.

Preferably the mapping board is substantially parallel to the conductive plates.

Preferably the main board is substantially parallel to the conductive plates.

Preferably the main board is free from connection to the contact pins.

Preferably the mapping board is soldered to the contact pins.

Preferably the mapping board has a plurality of holes each for receiving therethrough a respective one of the contact pins.

Preferably the header is arranged at one end of the mapping board spaced from the array of contact pins.

Preferably the mapping board has conductive traces on both sides.

Preferably there is provided a second set of conductive plates arranged side by side with and separate from the conductive plates and wherein a single mapping board bridges and is connected to both sets of conductive plates by two arrays of contact pins.

Preferably the contact pins are arranged in an array of rows and columns, wherein the mapping board has holes therein for receiving the contact pins therethrough, wherein some of the pins of the array are missing and wherein the mapping board is arranged with no holes at the missing pins so as to allow the mapping board to engage only over a matching array of pins and not over an array of pins with different missing pins.

Preferably the pins of the header are arranged in groups of different functions for connection to the processor.

Preferably the processor includes programs for different arrangements of contact terminals and electrical components for attachment thereto, and wherein the mapping board includes pins of the header arranged to indicate to the processor which of the different arrangements the mapping board is designed to fit.

According to a second aspect of the invention there is provided a method of manufacturing an electric power distribution and control apparatus comprising:

manufacturing a first electrical connection apparatus comprising:

a first plurality of first conductive plates arranged in generally parallel, at least partly overlying relationship;

each first conductive plate having a plurality of contact pads at spaced positions across the plate;

each first conductive plate having conductive traces thereon electrically connecting certain one or ones of the contact pads thereon to certain other or others of the contact pads thereon;

at least one of the first conductive plates having first contact terminals in a first arrangement of the terminals in electrical connection therewith for connection to electrical components in a first arrangement for supply of electrical current thereto or receipt of electrical current therefrom;

a first array of contact pins each passing through at least one hole in at least one of the conductive plates at a location thereon at a respective one of the contact pads such that the first array of pins provides connection between selected contact pads of different selected first conductive plates;

manufacturing a second electrical connection apparatus comprising:

a second plurality of second conductive plates arranged in generally parallel, at least partly overlying relationship;

each second conductive plate having a plurality of contact pads at spaced positions across the plate;

each second conductive plate having conductive traces thereon electrically connecting certain one or ones of the contact pads thereon to certain other or others of the contact pads thereon;

at least one of the second conductive plates having second contact terminals in a second arrangement of the terminals in electrical connection therewith for connection to electrical components in a second arrangement for supply of electrical current thereto or receipt of electrical current therefrom;

a second array of contact pins each passing through at least one hole in at least one of the second conductive plates at a location thereon at a respective one of the contact pads such that the second array of pins provides connection between selected contact pads of different selected second conductive plates;

the first electrical connection apparatus being different from the second electrical connection apparatus such that the first contact terminals are different from the second contact terminals for connection to different electrical components in a different arrangement;

manufacturing for the first electrical connection apparatus a first electronic system including at least one first printed circuit board having electronic components mounted thereon including a first processor;

the first electronic system being arranged for connection to a communication bus for communication of data thereon relating to the electrical connections;

the first electronic system being arranged to provide outputs for connection through at least one of the first conductive plates to the first contact terminals;

the first electronic system being arranged to receive inputs through at least one of the first conductive plates from the first contact terminals;

the first processor having a program for controlling communication on the communications bus and for controlling said outputs in response to said inputs and said communication;

the first electronic system including at least one first main printed circuit board having the electronic components thereon;

the first electronic system including at least one first mapping circuit board having a plurality of contact pads thereon arranged for connection to respective ones of the first array of pins;

the first electronic system including a header having a male pin array and a female socket array connecting the main printed circuit board and the mapping circuit board;

the first mapping circuit board having a plurality of circuit traces thereon connecting the contact pads thereon to the header;

manufacturing for the second electrical connection apparatus a second electronic system including at least one second printed circuit board having electronic components mounted thereon including a second processor;

the second electronic system being arranged for connection to a communication bus for communication of data thereon relating to the electrical connections;

the second electronic system being arranged to provide outputs for connection through at least one of the second conductive plates to the second contact terminals;

the second electronic system being arranged to receive inputs through at least one of the second conductive plates from the second contact terminals;

the second processor having a program for controlling communication on the communications bus and for controlling said outputs in response to said inputs and said communication;

the second electronic system including at least one second main printed circuit board having the electronic components thereon;

the second electronic system including at least one second mapping circuit board having a plurality of contact pads thereon arranged for connection to respective ones of the array of pins;

the second electronic system including a header having a male pin array and a female socket array connecting the main printed circuit board and the mapping circuit board;

the second mapping circuit board having a plurality of circuit traces thereon connecting the contact pads thereon to the header;

wherein the first main printed circuit board with the components thereon is the substantially identical to the second main printed circuit board with the components thereon;

wherein the first mapping board is arranged to cooperate with the first electrical connection apparatus and the second mapping board is arranged to cooperate with the second electrical connection apparatus, so that the first mapping board is different from the second mapping board;

and wherein a portion of the header of the main boards matches both the portion of the header on both the first and second mapping boards.

In accordance with one important aspect of the method, the contact pins are arranged in an array of rows and columns, wherein the first mapping board has holes therein for receiving the contact pins therethrough of the first array, wherein some of the pins of the first array are missing and wherein the first mapping board is arranged with no holes at the missing pins so as to allow the first mapping board to engage only over the first array of pins and wherein the second mapping board has holes therein for receiving the contact pins therethrough of the second array, wherein some of the pins of the second array are missing and wherein the second mapping board is arranged with no holes at the missing pins so as to allow the second mapping board to engage only over the second array of pins such that the first and second mapping boards will not fit the second and first arrays respectively.

In accordance with another important aspect of the method, the pins of the header are arranged in groups of different functions for connection to the processor such that the pins of the header of the first mapping board are the same as the pins of the header of the second mapping board.

In accordance with another important aspect of the method, the processor includes programs for both the first and second electrical connection apparatus and the first and second mapping boards include pins of the header arranged to indicate to the processor which of the first and second mapping board is connected thereto.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
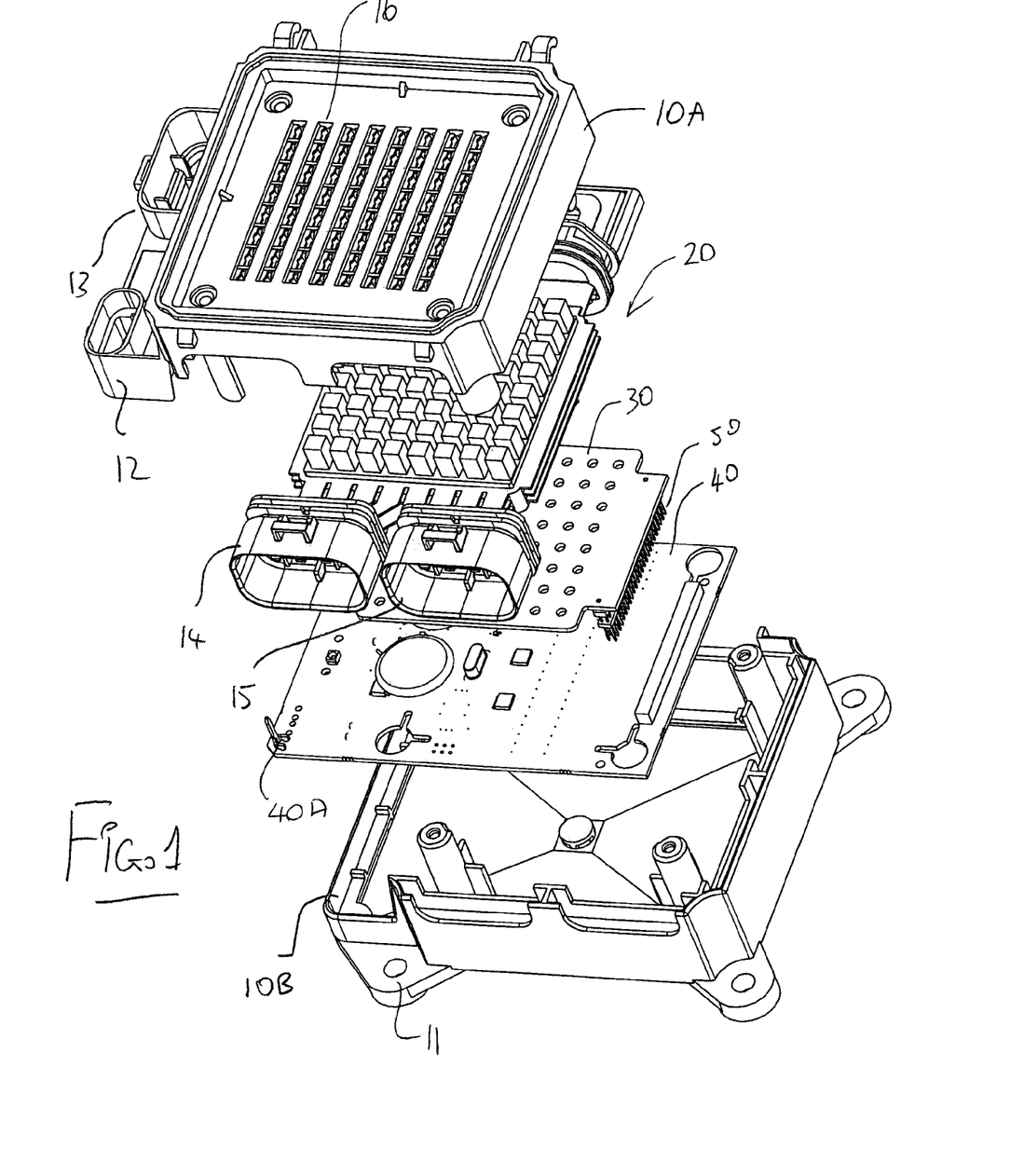
FIG. 1 is an exploded view of an apparatus according to the present invention.
Figure 2:
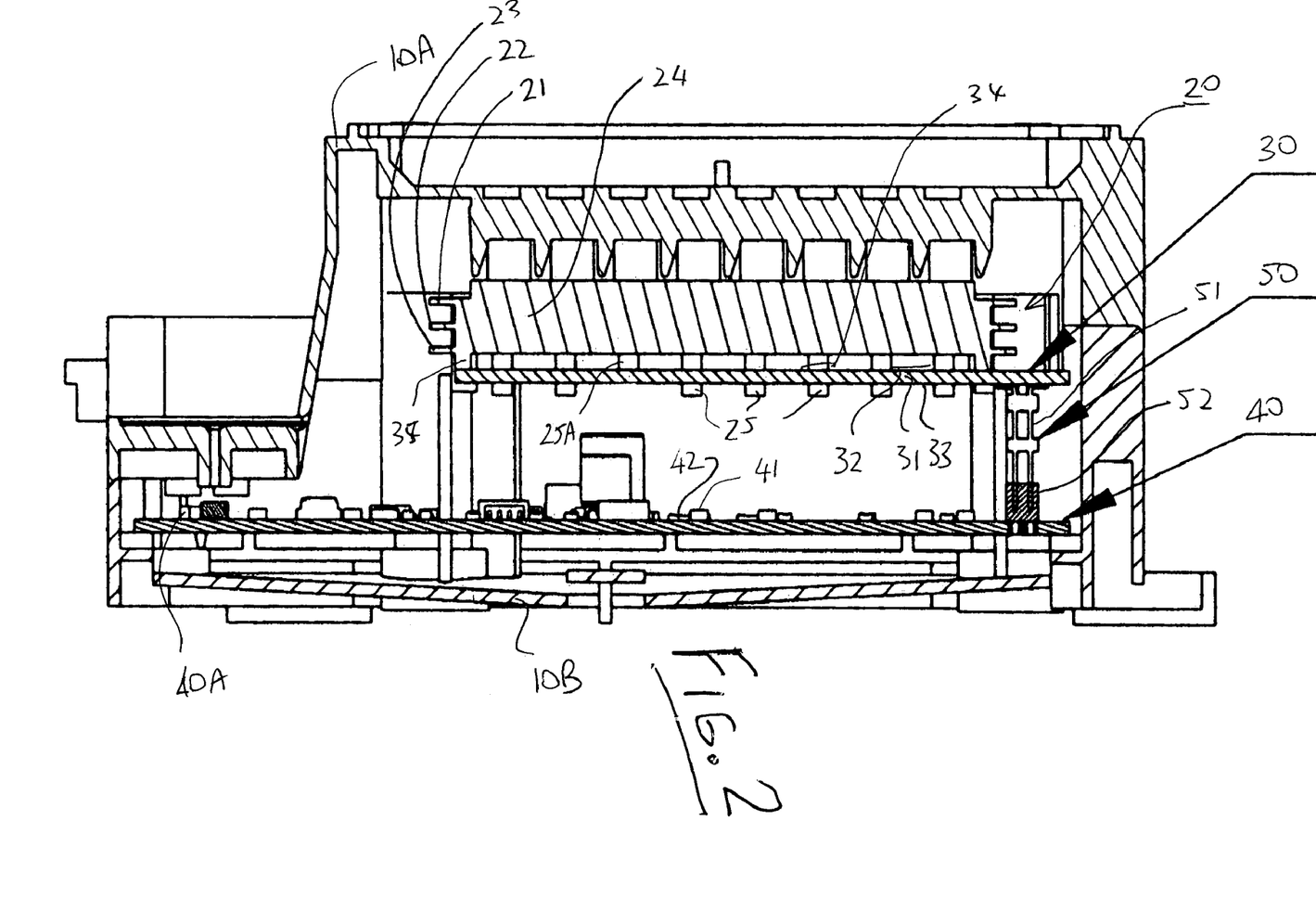
FIG. 2 is a cross sectional view of the apparatus of FIG. 1.

The apparatus comprises a housing defined by an upper housing portion 10A and a lower housing portion 10B. These mate together to enclose the electrical components in a suitable manner as will be well known to one skilled in the art. The housing includes mounting lugs 11 by which the housing can be mounted at a suitable location within the machine to be supplied with electrical current. The housing includes openings 12, 13, 14 and 15 for connection to terminals of the machine to supply and receive current as required.

The housing provides a mounting array 16 for components such as fuses to be attached to the electrical system so that the components can be inserted through openings in the housing to engage the electrical connections provided by the apparatus.

Within the housing is mounted an electrical connection system generally indicated at 20 which attaches to the terminals provided at the connector 12 through 16. At the bottom of the electrical connection system 20 is provided a mapping board 30 which connects to a main circuit board 40 through a header 50.

The electrical connection system 20 is of the type disclosed in the above U.S. Pat. No. 6,496,377 of Happ et al and in a product manufactured based on the patent by Cooper Bussman, the disclosure of which is incorporated herein by reference. Thus the electrical connection apparatus 20 includes a series of conductive plates 21, 22 and 23 which are arranged in generally parallel generally overlying relationship. The plates are each spaced from the next and separated by a layer of insulation 24.

As is well known from the above patent, and particularly the figures thereof, each of the plates carries a series of contact pads in a spaced array across the plate. The contact pads are connected together by conductive traces in a selected arrangement. The contact pads of the plates are connected to contact pads of the other plates by a series of pins 25 which project through the plates.

Thus, an electrical connection system can be generated which can be tailored to particular requirements of connectors and circuit components by manufacturing the plates to a particular arrangement of contact pads and connecting traces and manufacturing the pins so as to connect selected contact pads on selected ones of the plates to one or other of the plates.

After the plates have been manufactured to the required arrangement and assembled together with the insulation, a high temperature soldering system is used to confirm the attachment of the pins to the contact pads. The finished product with the insulation and the soldered connections provides an effective connection system for the arrangement of terminals and components which have been selected for the particular machine.

This arrangement is manufactured widely in view of its economic construction for machines of a type which are not manufactured in very large manufacturing runs such as automobiles. The product is rugged, economical and effective. Changes in the product can be made by reconfiguring the traces without significant cost.

In the present arrangement, a microprocessor and electronics component is attached to the electrical system to provide the advantage of electronics communications and control systems.

Thus there is provided the main circuit board 40 which is populated with electronic components 41 including the processor 42. These are attached to the conventional main printed circuit board on an upper surface thereof so that the bottom surface of the main circuit board sits in contact with the housing and is supported thereby in fixed position in the assembled condition of the apparatus.

The main circuit board provides terminals for connection to a communication system. The terminals are shown at 40A. A typical communication system is provided by the protocol known as CAN-BUS which allows communications between various components of a vehicle including engine control components. Thus the electronics components on the main board 40 provide this communication and provide control of the currents provided at a series of different outputs in dependence upon communications from the communications system and in dependence upon programs available to the processor 42.

Examples of this arrangement are shown in U.S. Pat. No. 6,501,368 issued Dec. 31$^{st}$ 2002 and U.S. Pat. No. 6,580,953 issued Jun. 17th 2003 both to Wiebe et al and both assigned to the present applicant, the disclosures of which are incorporated herein by reference.

Rather than the main circuit board 40 being connected to the electrical system 20, instead the connection is provided through a mapping board 30. This comprises a printed circuit board 31 having traces 32 on its upper side and traces 33 on its lower side. These traces connect to individual contact pads 34 located at the pins 25. Thus the circuit board 30 formed in conventional manner from conventional plastics materials is shaped and arranged so that it lies generally parallel to and spaced from the plates 21, 22 and 23. The circuit board 30 is held in position spaced from the plates by a portion 35 of the insulation material. The traces from the contact pads communicate to a conventional header 50 arranged for connection between the two printed circuit boards 30 and 40. The header 50 includes a male pin array 51 and a female socket array 52 again of a conventional nature. The male pin array in the arrangement shown is attached to the mapping board with a socket array attached to the main board but this can be reversed if desired. The header is arranged at one end of the mapping board beyond the electrical section 20 so that it is free from the area of the pin array.

The arrangement is designed so that a single main board 40 of a specific and fixed design can be used with different arrangements of electrical system 20 and mapping board 30 to provide different control systems for different machines.

Typically an arrangement of this type might provide 5 different layouts of electrical components and connections therefor. This number is only typical and is not intended to be limiting. A manufacture of a machine can therefore select from the five different layouts one which particularly suits the machine concerned. Thus the machine manufacture is not fixed to use a particular single arrangement but can select from a number of different arrangements all of which can be provided simply using the arrangement shown and described herein. Thus the electrical component 20 and the mapping 30 are arranged and designed so that they fit the particular one of the five different designs available. The header 50 remains identical and designed and arranged to provide connection to the main board. The header thus has a series of pins in an array and these pins are selected and arranged to provide connection to particular inputs and outputs of the processing system on the main board. These pins can thus provide outputs to relays, outputs to other components, inputs from sensing elements and other arrangements as required. The pins remain the same in all configurations. The pins are then connected to different ones of the contact pads of the mapping board by the selected tracing arrangements which is designed to match the particular one of the five different designs available.

In this way the main board can be manufactured in larger numbers for use with all of the different designs. Thus the cost of the main board is kept at a minimum so that a single type of main board is manufactured at all times.

The mapping board itself is a very simple board which is formed by cutting and punching so that it holes to match the array of pins 25. This board can therefore be manufactured in different arrangements at low cost in view of its simplicity.

In manufacturing of the number of different arrangements, therefore, it is highly desirable to ensure that no errors are made in the assembly of the components. Any such errors would likely lead to the connection of currents within the system to places where they should not be connected leading to the potential of components being damaged or even fire.

For this reason, the pin array of the pins 25 is arranged with one or more of the pins to a length so that the pin does not extend into or through the mapping board 30. This is indicated at pin 25A where the pin does not project into or through a corresponding hole in the mapping board 30. Thus the pins can be arranged in an array such that one or more of the pins is omitted which matches a point on the mapping board where a corresponding hole is also omitted. Thus it will be appreciated that the different mapping boards can be arranged so that they have a different hole array so that each mapping board will fit onto only its own design of electrical system 20 with the corresponding array of pins 25. If a potential error arises where an incorrect mapping board is to be applied to an electrical system to which it does not correspond, then the mapping board will not fit since the holes will not align making the error clear before the error is compounded by assembling the system together to a finished product.

Further, it is possible that the memory available to the processor 42 and the processing elements on the board 40 is sufficient to contain the code for all of the different arrangements with which the board 40 is to be used. Thus the board 40 is capable of co-operation with each and every one of the different arrangements with which it is to be used. In this arrangement, some of the pins of the header are arranged as "configuration pins". These pins connect with traces on the mapping board so that the pins provide connection to ground or no connection at all and thus the pins provide an input in a particular configuration to the processor to inform it of the mapping board to which it has been connected. Thus it will be appreciated that each of the mapping board has a different configuration of the configuration pins which is unique to that particular mapping board so that the assembly can continue without the concern of the manufacturing system as to providing an input into the main board since the input defining the system to which it is to be associated is provided by the mapping board itself.

The mapping board can be assembled with the electrical system 20 and soldered into place using the same soldering system while remote from the main board. In this way the main board can be manufactured using conventional systems without bringing the main board into the area of the soldering system used for the electrical system. Only when both parts are complete and ready to assemble in the housing is the connection completed by the header 50.

Conventional headers of this type are well known and simply provide a friction fit between the pins and the socket array so that connection can be made easily. It is commonly used that there is a single header between the mapping board and the main board for avoiding mechanical complication and increased tolerances necessary if there were two such headers. The selection of the number of pins of the header is therefore necessary in response to the number of connections which can be provided to the processing system.

Plus it will be appreciated that the processing system must provide sufficient outputs and sufficient inputs for all of the systems to which it is to be attached. Thus in any particular arrangement some or many of the pins may be redundant.

Commonly an arrangement is manufactured in which there are two electrical connecting system 20 arranged side by side within a single housing. Such an arrangement may be connected to a single mapping board which bridges both the electrical connection systems and cooperates with the pin array of each. The mapping board can then be attached using a single header to a single main board in the arrangement shown and described above.

Alternatively a dual device may use two mapping boards. There will be only one controller board (just with more input/output capability) than the single unit. To duplicate the processor adds cost and they are really not being "over-taxed" in this application. We want the device (single or dual) to be considered as one "node" on a multiple CAN based system. Adding a second processor uses up another node location. So the controller board for dual device will be larger and have 2 header pin arrangement to interface directly onto the two mapping boards.

There are a number of different possible configurations of relays and fuses for the entire block. The various configurations will determine how many pins are required for the board header connection between the mapping board and the micro board. They will also determine the number of inputs and outputs required on the micro board. The following conditions may apply:

The relays used in the VEC could be either 4 or 5 terminal relays.

The 5 terminal relays have both normally open and normally closed contacts.

The 4 terminal relays have just the normally open contact and work as an ON/OFF switch.

The VEC block has a maximum of 64 stuffing locations on the 8×8 grid.

The VEC block has a maximum of 32 external terminal connections.

Two high side digital inputs are used to monitor the 2 VEC power connections.

Three configuration lines are used to tell the micro board which mapping board configuration is being used.

The following are the configurations identified for the product.

| Count | 5-Relays | 4-Relays | Fuses | Bus | Bars | LS Out | HS In | Ref | Config | Total |
|---|---|---|---|---|---|---|---|---|---|---|
| 1 | 0 | 12 | 8 | 2 | 12 | 22 | 2 | 3 | 39 |
| 2 | 6 | 0 | 8 | 2 | 6 | 22 | 2 | 3 | 33 |
| 3 | | 8 | 16 | 2 | 8 | 26 | 2 | 3 | 39 |
| 4 | 8 | | 8 | 2 | 8 | 26 | 2 | 3 | 39 |
| 5 | | | 24 | 2 | 0 | 26 | 2 | 3 | 31 |
| 6 | | 8 | 16 | 1 | 8 | 25 | 2 | 3 | 38 |

The maximum number of board header pins required for any configuration is 39.

The maximum number of outputs is 12 and the maximum number of HS inputs is 26, which suggests that 43 board header pins will be required to support all configurations.

However, since the outputs can be used as inputs, these additional pins are not required. See the reference pin configuration spreadsheet "CB Pin Configurations.xls" for more information.

Based on this information the IO requirements on the micro board, and therefore the board header pin requirements, are as follows. This table does not include the external connections to the CAN connector.

| Board Type | Header | Configuration | Table Count |
|---|---|---|---|
| Vansco | LS | Outputs | 12 |
| Vansco | HS | Inputs | 22 |
| Vansco Configuration | Reference Pins | Voltage 3 | 2 |

Total Board Header Pins Required 39

In this table the assumption has been made that the micro board will draw its power off of power pins provided through the CAN connector.

If the relays used in this device will not contain protection diodes, then this protection will have to be provided by the electronics. Therefore, these board header pins may have to be allocated in pairs.

Since the total number of configurations is low, additional configuration pins have been added to the board header to indicate which configuration is being used. The pins will be tied low (or high) to the reference voltage provided by the micro board. The software would then auto-configure accordingly. If the number of configuration is high or expected to grow over time, then this approach will be limited.

To develop new configurations of this product, firstly the VEC layout is determined and then there is provided a lookup table between component and 8×8 grid location.

Eg: Fuse 1—1 ☐ Grid 2-1 Fuse 1–2 ☐ Grid 3–4

Each fuse would require 2 locations and each relay would require either 4 or 5 grid locations.

The output from this exercise is a lookup table between component and header pinout.

Eg: Fuse 1—1 ☐ Pin 5 Fuse 1–2 ☐ Pin 23

Each fuse requires 2 pin locations and each relay would require either 4 or 5 pin locations.

This means that for each fuse define the 2 corresponding inputs that connect to the fuse. For each relay define the output, the 2 or 3 HS-inputs, and the 1 LS-input.

The logic that will turn on and off the relays may be based on inputs that come from the VEC block or based on messages received on the CAN bus.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An electric power distribution and control apparatus comprising:
   a plurality of conductive plates arranged in generally parallel, at least partly overlying relationship;
   each conductive plate having a plurality of contact pads at spaced positions across the plate;
   each conductive plate having conductive traces thereon electrically connecting certain one or ones of the contact pads thereon to certain other or others of the contact pads thereon;
   at least one of the conductive plates having contact terminals in electrical connection therewith for connection to electrical components for supply of electrical current thereto or receipt of electrical current therefrom;
   an array of contact pins each passing through at least one hole in at least one of the conductive plates at a location thereon at a respective one of the contact pads such that the array of pins provides connection between selected contact pads of different selected conductive plates;
   an electronic system including at least one printed circuit board having electronic components mounted thereon including a processor;
   the electronic system being arranged for connection to a communication bus for communication of data thereon relating to the electrical connections;
   the electronic system being arranged to provide outputs for connection through at least one of the conductive plates to the contact terminals;
   the electronic system being arranged to receive inputs through at least one of the conductive plates from the contact terminals;
   the processor having a program for controlling communication on the communications bus and for controlling said outputs in response to said inputs and said communication;
   the electronic system including at least one main printed circuit board having the electronic components thereon;
   the electronic system including at least one mapping circuit board having a plurality of contact pads thereon arranged for connection to respective ones of the array of pins;
   the electronic system including a header having a male pin array and a female socket array connecting the main printed circuit board and the mapping circuit board;
   the mapping circuit board having a plurality of circuit traces thereon connecting the contact pads thereon to the header.

2. The apparatus according to claim 1 wherein the mapping board is substantially parallel to the conductive plates.

3. The apparatus according to claim 1 wherein the main board is substantially parallel to the conductive plates.

4. The apparatus according to claim 1 wherein the main board is free from connection to the contact pins.

5. The apparatus according to claim 1 wherein the mapping board is soldered to the contact pins.

6. The apparatus according to claim 1 wherein the mapping board has a plurality of holes each for receiving therethrough a respective one of the contact pins.

7. The apparatus according to claim 1 wherein the header is arranged at one end of the mapping board spaced from the array of contact pins.

8. The apparatus according to claim 1 wherein the mapping board has conductive traces on both sides.

9. The apparatus according to claim 1 wherein there is provided a second set of conductive plates arranged side by side with and separate from the conductive plates and wherein a single mapping board bridges and is connected to both sets of conductive plates by two arrays of contact pins.

10. The apparatus according to claim 1 wherein the contact pins are arranged in an array of rows and columns, wherein the mapping board has holes therein for receiving the contact pins therethrough, wherein some of the pins of the array are missing and wherein the mapping board is arranged with no holes at the missing pins so as to allow the mapping board to engage only over a matching array of pins and not over an array of pins with different missing pins.

11. The apparatus according to claim 1 wherein the pins of the header are arranged in groups of different functions for connection to the processor.

12. The apparatus according to claim 1 wherein the processor includes programs for different arrangements of contact terminals and electrical components for attachment thereto, and wherein the mapping board includes pins of the header arranged to indicate to the processor which of the different arrangements the mapping board is designed to fit.

13. A method of manufacturing an electric power distribution and control apparatus comprising:
   manufacturing a first electrical connection apparatus comprising:
      a first plurality of first conductive plates arranged in generally parallel, at least partly overlying relationship;
      each first conductive plate having a plurality of contact pads at spaced positions across the plate;
      each first conductive plate having conductive traces thereon electrically connecting certain one or ones of the contact pads thereon to certain other or others of the contact pads thereon;
      at least one of the first conductive plates having first contact terminals in a first arrangement of the terminals in electrical connection therewith for connection to electrical components in a first arrangement for supply of electrical current thereto or receipt of electrical current therefrom;
      a first array of contact pins each passing through at least one hole in at least one of the conductive plates at a location thereon at a respective one of the contact pads such that the first array of pins provides connection between selected contact pads of different selected first conductive plates;
   manufacturing a second electrical connection apparatus comprising:
      a second plurality of second conductive plates arranged in generally parallel, at least partly overlying relationship;
      each second conductive plate having a plurality of contact pads at spaced positions across the plate;
      each second conductive plate having conductive traces thereon electrically connecting certain one or ones of the contact pads thereon to certain other or others of the contact pads thereon;
      at least one of the second conductive plates having second contact terminals in a second arrangement of the terminals in electrical connection therewith for connection to electrical components in a second arrangement for supply of electrical current thereto or receipt of electrical current therefrom;
      a second array of contact pins each passing through at least one hole in at least one of the second conductive plates at a location thereon at a respective one of the contact pads such that the second array of pins provides connection between selected contact pads of different selected second conductive plates;

the first electrical connection apparatus being different from the second electrical connection apparatus such that the first contact terminals are different from the second contact terminals for connection to different electrical components in a different arrangement;

manufacturing for the first electrical connection apparatus a first electronic system including at least one first printed circuit board having electronic components mounted thereon including a first processor;

the first electronic system being arranged for connection to a communication bus for communication of data thereon relating to the electrical connections;

the first electronic system being arranged to provide outputs for connection through at least one of the first conductive plates to the first contact terminals;

the first electronic system being arranged to receive inputs through at least one of the first conductive plates from the first contact terminals;

the first processor having a program for controlling communication on the communications bus and for controlling said outputs in response to said inputs and said communication;

the first electronic system including at least one first main printed circuit board having the electronic components thereon;

the first electronic system including at least one first mapping circuit board having a plurality of contact pads thereon arranged for connection to respective ones of the first array of pins;

the first electronic system including a header having a male pin array and a female socket array connecting the main printed circuit board and the mapping circuit board;

the first mapping circuit board having a plurality of circuit traces thereon connecting the contact pads thereon to the header;

manufacturing for the second electrical connection apparatus a second electronic system including at least one second printed circuit board having electronic components mounted thereon including a second processor;

the second electronic system being arranged for connection to a communication bus for communication of data thereon relating to the electrical connections;

the second electronic system being arranged to provide outputs for connection through at least one of the second conductive plates to the second contact terminals;

the second electronic system being arranged to receive inputs through at least one of the second conductive plates from the second contact terminals;

the second processor having a program for controlling communication on the communications bus and for controlling said outputs in response to said inputs and said communication;

the second electronic system including at least one second main printed circuit board having the electronic components thereon;

the second electronic system including at least one second mapping circuit board having a plurality of contact pads thereon arranged for connection to respective ones of the array of pins;

the second electronic system including a header having a male pin array and a female socket array connecting the main printed circuit board and the mapping circuit board;

the second mapping circuit board having a plurality of circuit traces thereon connecting the contact pads thereon to the header;

wherein the first main printed circuit board with the components thereon is the substantially identical to the second main printed circuit board with the components thereon;

wherein the first mapping board is arranged to cooperate with the first electrical connection apparatus and the second mapping board is arranged to cooperate with the second electrical connection apparatus, so that the first mapping board is different from the second mapping board;

and wherein a portion of the header of the main boards matches both the portion of the header on both the first and second mapping boards.

14. The method according to claim 13 wherein the contact pins are arranged in an array of rows and columns, wherein the first mapping board has holes therein for receiving the contact pins therethrough of the first array, wherein some of the pins of the first array are missing and wherein the first mapping board is arranged with no holes at the missing pins so as to allow the first mapping board to engage only over the first array of pins and wherein the second mapping board has holes therein for receiving the contact pins therethrough of the second array, wherein some of the pins of the second array are missing and wherein the second mapping board is arranged with no holes at the missing pins so as to allow the second mapping board to engage only over the second array of pins such that the first and second mapping boards will not fit the second and first arrays respectively.

15. The method according to claim 13 wherein the pins of the header are arranged in groups of different functions for connection to the processor such that the pins of the header of the first mapping board are the same as the pins of the header of the second mapping board.

16. The method according to claim 13 wherein the processor includes programs for both the first and second electrical connection apparatus and wherein the first and second mapping boards include pins of the header arranged to indicate to the processor which of the first and second mapping board is connected thereto.

* * * * *

UNITED STATES PATENT AND TRADEMARK OFFICE
CERTIFICATE OF CORRECTION

PATENT NO.        : 7,375,981 B2                                    Page 1 of 1
APPLICATION NO.   : 11/370176
DATED             : May 20, 2008
INVENTOR(S)       : Kevin Dickson It is certified that error appears in the above-identified patent and that said Letters Patent is hereby corrected as shown below:

Title Page; item (73);
The Assignee should be listed as Vanco Electronics LP, Winnipeg, Manitoba (CA) and Cooper Technologies Company, Houston, Texas (US).

Signed and Sealed this

Seventh Day of April, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,375,981 B2  Page 1 of 1
APPLICATION NO. : 11/370176
DATED : May 20, 2008
INVENTOR(S) : Kevin Dickson

It is certified that error appears in the above-identified patent and that said Letters Patent is hereby corrected as shown below:

Title Page; item (73);
The Assignee should be listed as Vansco Electronics LP, Winnipeg, Manitoba (CA) and Cooper Technologies Company, Houston, Texas (US).

This certificate supersedes the Certificate of Correction issued April 7, 2009.

Signed and Sealed this

Nineteenth Day of May, 2009

JOHN DOLL
*Acting Director of the United States Patent and Trademark Office*